UNITED STATES PATENT OFFICE.

PHILEMON WRIGHT, OF BROOKLYN, NEW YORK.

ROOFING COMPOUND.

SPECIFICATION forming part of Letters Patent No. 230,912, dated August 10, 1880.

Application filed May 21, 1880. (No model.)

*To all whom it may concern:*

Be it known that I, PHILEMON WRIGHT, residing at Brooklyn, in the county of Kings and State of New York, have invented a new and useful composition of matter to be used in roofing buildings and covering vaults and other structures, of which the following is a specification.

My composition consists of the following ingredients, combined in the proportions stated, namely: the flyings of ground calcined gypsum and coal-tar in equal proportions by bulk, or nearly equal; but the proportions may be varied according to the consistency desired in the composition in using it. These ingredients are to be mixed together by stirring the flyings into the tar while melted and hot. No gravel, sand, or other substance is to be mixed with these two ingredients. Then boil and stir the composition until it is thoroughly mixed. Apply it while hot with brushes in the following manner: First, cover the boards, tin, or other foundation upon which it is to be laid, evenly with a light coating of the composition. Then cover the composition thus applied with roofing-felt, sticking the felting tightly to the boards, tin, or other foundation. Then spread another coat of the composition on the top of the felt with a brush, as before, and then apply another layer of roofing-felt and of the composition, alternately, until as many coats are applied as is necessary for the roof, usually from one to three coats of each, according to the purpose for which it is to be used. Lastly, cover the whole with a coating of the composition about three-sixteenths of an inch thick, applied with a brush, as before. No nails or cleats are to be used in the body of the roof.

I am aware that coal-tar has been used for roofing, both separately and mixed with other ingredients, and both with and without roofing-felt; but I am not aware that both the ingredients of my composition in the proportions stated, or in any proportions, have been used together.

What I claim, and desire to secure by Letters Patent of the United States, is—

The herein-described composition of matter to be used for roofing buildings and covering vaults and other structures, consisting of the flyings of ground calcined gypsum and of coal-tar.

PHILEMON WRIGHT.

Witnesses:
N. GANO DUNN,
CLARENCE D. JONES.